US007017820B1

(12) United States Patent
Brunner

(10) Patent No.: US 7,017,820 B1
(45) Date of Patent: Mar. 28, 2006

(54) MACHINE AND PROCESS FOR MANUFACTURING A LABEL WITH A SECURITY ELEMENT

(75) Inventor: James Brunner, 649 Anderson Dr., Lake In The Hills, IL (US) 60102

(73) Assignee: James Brunner, Lake in the Hills, IL (US)

( * ) Notice: Subject to any disclaimer, the term of this patent is extended or adjusted under 35 U.S.C. 154(b) by 678 days.

(21) Appl. No.: 09/779,903

(22) Filed: Feb. 8, 2001

(51) Int. Cl.
*G06K 19/00* (2006.01)

(52) U.S. Cl. ........................................................ 235/487

(58) Field of Classification Search ........ 235/486–487; 156/361–364, 351, 541, 449, 302, 304, 341, 156/251, 265; 428/41, 354; 283/83
See application file for complete search history.

(56) References Cited

U.S. PATENT DOCUMENTS

| | | | | |
|---|---|---|---|---|
| 2,449,972 | A | | 9/1948 | Beach |
| 3,097,983 | A | | 7/1963 | Caulford et al. |
| 3,415,705 | A | | 12/1968 | Ettre |
| 3,542,578 | A | | 11/1970 | Lang |
| 3,636,408 | A | | 1/1972 | Shuman |
| 3,757,164 | A | | 9/1973 | Binkowski |
| 3,913,219 | A | | 10/1975 | Lichtblau |
| 3,933,564 | A | * | 1/1976 | Jensen ........................ 156/265 |
| 4,075,618 | A | | 2/1978 | Montean |
| 4,082,595 | A | * | 4/1978 | Slater ......................... 156/351 |
| 4,183,779 | A | * | 1/1980 | Barber et al. ............... 156/361 |
| 4,294,644 | A | * | 10/1981 | Anderson .................. 156/361 |
| 4,363,070 | A | | 12/1982 | Kisler |
| 4,369,557 | A | | 1/1983 | Vandebult |
| 4,475,969 | A | | 10/1984 | Reed |
| 4,585,505 | A | * | 4/1986 | Matsuguchi ................ 156/361 |
| 4,660,025 | A | | 4/1987 | Humphrey |
| 4,694,283 | A | | 9/1987 | Reeb |
| 4,717,438 | A | | 1/1988 | Benge et al. |
| 4,785,735 | A | | 11/1988 | Hamisch, Jr. |
| 4,802,944 | A | | 2/1989 | Benge |
| 4,846,922 | A | | 7/1989 | Benge et al. |
| D306,043 | S | | 2/1990 | Hickmott |
| 4,900,386 | A | | 2/1990 | Richter-Jörgensen |
| 4,910,499 | A | | 3/1990 | Benge et al. |
| 4,932,684 | A | | 6/1990 | Vermeulen |
| D309,159 | S | | 7/1990 | Hickmott |
| 4,949,608 | A | | 8/1990 | Ward et al. |
| 4,954,814 | A | | 9/1990 | Benge |

(Continued)

FOREIGN PATENT DOCUMENTS

DE 42 38 145 5/1994

(Continued)

OTHER PUBLICATIONS

"Various Advertisements and Articles," Nutritional Outlook, Mar. 2000, six pages, while the date of the publication is unknown, it is believed to have been published prior to Feb. 8, 2001.

(Continued)

*Primary Examiner*—Thien M. Le
*Assistant Examiner*—Edwyn Labaze
(74) *Attorney, Agent, or Firm*—Brinks Hofer Gilson & Lione

(57) ABSTRACT

A process for manufacturing a label that includes moving a web of a substrate along a first direction, placing a label upon a portion of the web, pressing the label onto the portion of the web so as to attach the label to the portion of the web and diminishing skewing of the portion of the web during the pressing.

36 Claims, 7 Drawing Sheets

U.S. PATENT DOCUMENTS

| | | | | |
|---|---|---|---|---|
| D311,215 | S | 10/1990 | Hickmott | |
| 4,967,185 | A | 10/1990 | Montean | |
| 4,972,616 | A | 11/1990 | Doll | |
| 4,987,723 | A | 1/1991 | Diemer | |
| 5,006,856 | A | 4/1991 | Benge et al. | |
| 5,076,011 | A | 12/1991 | Stehouwer | |
| 5,081,445 | A | 1/1992 | Gill et al. | |
| 5,083,112 | A | 1/1992 | Piotrowski et al. | |
| 5,091,052 | A | 2/1992 | Nowak et al. | |
| D324,659 | S | 3/1992 | Stehouwer | |
| 5,146,204 | A | 9/1992 | Zhou et al. | |
| 5,151,684 | A | 9/1992 | Johnson | |
| 5,167,752 | A | 12/1992 | Dowling | |
| 5,170,712 | A | 12/1992 | Stehouwer | |
| 5,172,461 | A | 12/1992 | Pichl | |
| 5,182,544 | A | 1/1993 | Aquilera et al. | |
| 5,184,111 | A | 2/1993 | Pichl | |
| 5,200,243 | A | 4/1993 | Van Veen | |
| 5,284,689 | A | 2/1994 | Laurash et al. | |
| 5,294,068 | A | 3/1994 | Baro et al. | |
| 5,339,517 | A | 8/1994 | Diemer | |
| 5,350,483 | A | 9/1994 | Yager et al. | |
| 5,388,748 | A | 2/1995 | Davignon et al. | |
| 5,388,749 | A | 2/1995 | Davignon et al. | |
| 5,394,293 | A | 2/1995 | Grarovsky | |
| 5,400,208 | A | 3/1995 | Pazda et al. | |
| 5,432,499 | A | 7/1995 | Montean | |
| 5,458,729 | A * | 10/1995 | Galchefski et al. | 156/449 |
| 5,467,524 | A | 11/1995 | Diemer | |
| 5,477,219 | A | 12/1995 | Zarembo et al. | |
| 5,494,550 | A | 2/1996 | Benge | |
| 5,496,611 | A | 3/1996 | Ikeda et al. | |
| 5,512,125 | A | 4/1996 | Momot et al. | |
| 5,560,970 | A | 10/1996 | Ludebuhl | |
| 5,583,489 | A | 12/1996 | Loemker et al. | |
| 5,597,653 | A | 1/1997 | Ikeda et al. | |
| 5,607,539 | A * | 3/1997 | Kuppersbusch | 156/364 |
| 5,614,278 | A * | 3/1997 | Chamberlain et al. | 428/354 |
| 5,645,932 | A | 7/1997 | Uchibori | |
| 5,660,663 | A | 8/1997 | Chamberlain et al. | |
| 5,736,967 | A | 4/1998 | Kayser et al. | |
| 5,747,192 | A | 5/1998 | Hughen et al. | |
| 5,751,256 | A | 5/1998 | McDonough et al. | |
| 5,830,571 | A | 11/1998 | Mann et al. | |
| D402,863 | S | 12/1998 | Hickmott | |
| 5,844,485 | A | 12/1998 | Ryan, Jr. | |
| 5,853,530 | A * | 12/1998 | Allen | 156/541 |
| 5,858,143 | A | 1/1999 | Bright et al. | |
| 5,867,102 | A * | 2/1999 | Souder et al. | 283/83 |
| 5,954,907 | A | 9/1999 | LaRose et al. | |
| 5,961,228 | A | 10/1999 | Ward et al. | |
| 6,024,148 | A * | 2/2000 | Saitoh et al. | 156/361 |
| D427,639 | S | 7/2000 | Hickmott | |
| D428,445 | S | 7/2000 | Hickmott | |
| 6,092,449 | A | 7/2000 | Ward et al. | |
| 6,120,637 | A * | 9/2000 | Barry | 156/252 |
| 6,123,796 | A | 9/2000 | Kathmann et al. | |
| 6,165,306 | A * | 12/2000 | Rajala | 156/263 |
| 6,412,535 | B1 * | 7/2002 | Barilovits et al. | 156/362 |
| 6,558,490 | B1 * | 5/2003 | Klein et al. | 156/64 |
| 6,627,031 | B1 * | 9/2003 | Pinchen et al. | 156/251 |
| 6,634,401 | B1 * | 10/2003 | Kuhn et al. | 156/510 |
| 6,730,189 | B1 * | 5/2004 | Franzmann et al. | 156/265 |

FOREIGN PATENT DOCUMENTS

| | | |
|---|---|---|
| EP | 0 597 609 | 5/1994 |
| EP | 0 680 011 | 11/1995 |
| GB | 2 164 915 | 4/1986 |
| GB | 2 211 702 | 7/1989 |
| WO | WO 85/02285 | 5/1985 |
| WO | WO 95/04853 | 2/1995 |

OTHER PUBLICATIONS

"Impulse Source Tagging Program Implementation Guide," published by Checkpoint Meto, forty seven pages, while the date of the publication is unknown, it is believed to have been published prior to Feb. 8, 2001.

"Universal Labeling Systems SL 2000—Automatic High Speed Label Applicator," published by Universal Labeling Systems, two pages, while the date of the publication is unknown, it is believed to have been published prior to Feb. 8, 2001.

"Staticide Flyer," published by ACL Staticide, two pages, while the date of the publication is unknown, it is believed to have been published prior to Feb. 8, 2001.

"DC Series DC-duo Flyer," published by Tantec, Inc., two pages, while the date of the publication is unknown, it is believed to have been published prior to Feb. 8, 2001.

"Material Data Sheet for: SBL 2.5 pt.SC(42#) Tight Release Silicone Coated Liner," published by Dunsirn Industrial, one page, while the date of the publication is unknown, it is believed to have been published prior to Feb. 8, 2001.

* cited by examiner

MACHINE AND PROCESS FOR MANUFACTURING A LABEL WITH A SECURITY ELEMENT

BACKGROUND OF THE INVENTION

1. Field of the Invention

The present invention relates in general to a roll of material having consecutive and separable labels or tags. In particular, the present invention regards labels or tags that incorporate a detectable security element that protects goods from theft.

2. Discussion of Related Art

It is well known to protect articles against theft by attaching a security element mounted in labels or tags to the articles. In addition, a detector is installed at an exit area of a building or room where the articles could be removed from the building or room without authorization. The security element interacts with the detector upon the movement of the security element within a detection area defined by the detector. The security element typically interacts electromagnetically, that is, through high-frequency waves, or magnetically.

The label or tag typically is supplied on a web or a roll of labels. The web or roll includes a plurality of labels placed end to end to one another. Each label includes a security element that is located at the same position when compared with the position of the security elements of other labels. The web or roll includes a substrate upon which each label is mounted via adhesive bonding. The substrate and label material are preferably configured so that the adhesive stays with the label material rather than on the substrate upon removal of the label from the substrate. Accordingly, the labels can be detached from the substrate either manually or by a suitable hand-held labeler. The detached labels are subsequently attached to an article to be protected by a layer of adhesive provided on the rear side of the label.

A known manner of manufacture of the web or roll includes dispensing an irregular pattern of security elements onto a substrate and later dispensing a regular pattern of labels onto the substrate. The dispensing of the labels results in each of the security elements having a label placed thereon and labels placed on the substrate that do not include a security element. A roller is used to press the labels after they have been dispensed. One disadvantage of using a roller is that it can result in the substrate, security element and/or label becoming skewed relative to one another, which can result in a faulty end product. Such skewing can also result in jamming of a label machine or a roll breaking due to labels adhering to one another.

Another disadvantage of the dispensing of an irregular patter of security elements is that there is the distinct possibility that a person stealing an article may be lucky and pick an article with a label that lacks a security element.

A third disadvantage of many processes and machines that generate labels with security elements is that there is a significant loss in product due to errors in alignment during the process.

Once the web or roll of labels with security elements has been manufactured, it can be sold to manufacturers or retailers of articles to be protected. In one example, the labels are applied to the articles to be protected and stocked in a retail establishment. If the article is presented to a cashier for purchase, the cashier deactivates the security element. This allows the buyer of the article to pass through the detector without incident. If an article does not have its security element deactivated, an audible and/or visual and/or electronic warning will occur if the security element passes through the detector. Thus, unauthorized removal of the article is detected.

In view of the above state of the art, an object of the present invention is to reduce the occurrence of skewing when labels are placed on a substrate.

A second object of the present invention is to provide a process and system that efficiently manufactures preprinted security element labels where all labels contain a security element.

A third object of the present invention is to provide a process and system that substantially reduce the amount of product lost during the manufacture of preprinted security element labels.

SUMMARY OF THE INVENTION

One aspect of the present invention regards a label manufacturing system that includes a web of a substrate that moves along a first direction and a dispensing system. The dispensing system includes a planar area that moves parallel to the first direction and below the web, an applicator that places a label upon a portion of the web that lies above the planar area.

A second aspect of the present invention regards a process for manufacturing a label that includes moving a web of a substrate along a first direction, moving a planar area parallel to the first direction and below the web, placing a label upon a portion of the web that lies above the planar area.

A third aspect of the present invention regards a process for manufacturing a label that includes moving a web of a substrate along a first direction, placing a label upon a portion of the web, pressing the label onto the portion of the web so as to attach the label to the portion of the web and diminishing skewing of the portion of the web during the pressing.

Each aspect of the present invention provides the advantage of reducing skewing when placing labels on a substrate.

Each aspect of the present invention provides the advantage of improving the efficiency of manufacturing preprinted security element labels wherein all preprinted labels include security elements.

Each aspect of the present invention provides the advantage of substantially reducing the amount of product lost during the manufacture of preprinted security element labels.

Further advantages of the invention will become clear from the ensuing description of an exemplary embodiment in conjunction with the drawings.

DETAILED DESCRIPTION OF THE PREFERRED EMBODIMENTS OF THE INVENTION

Figure 1:
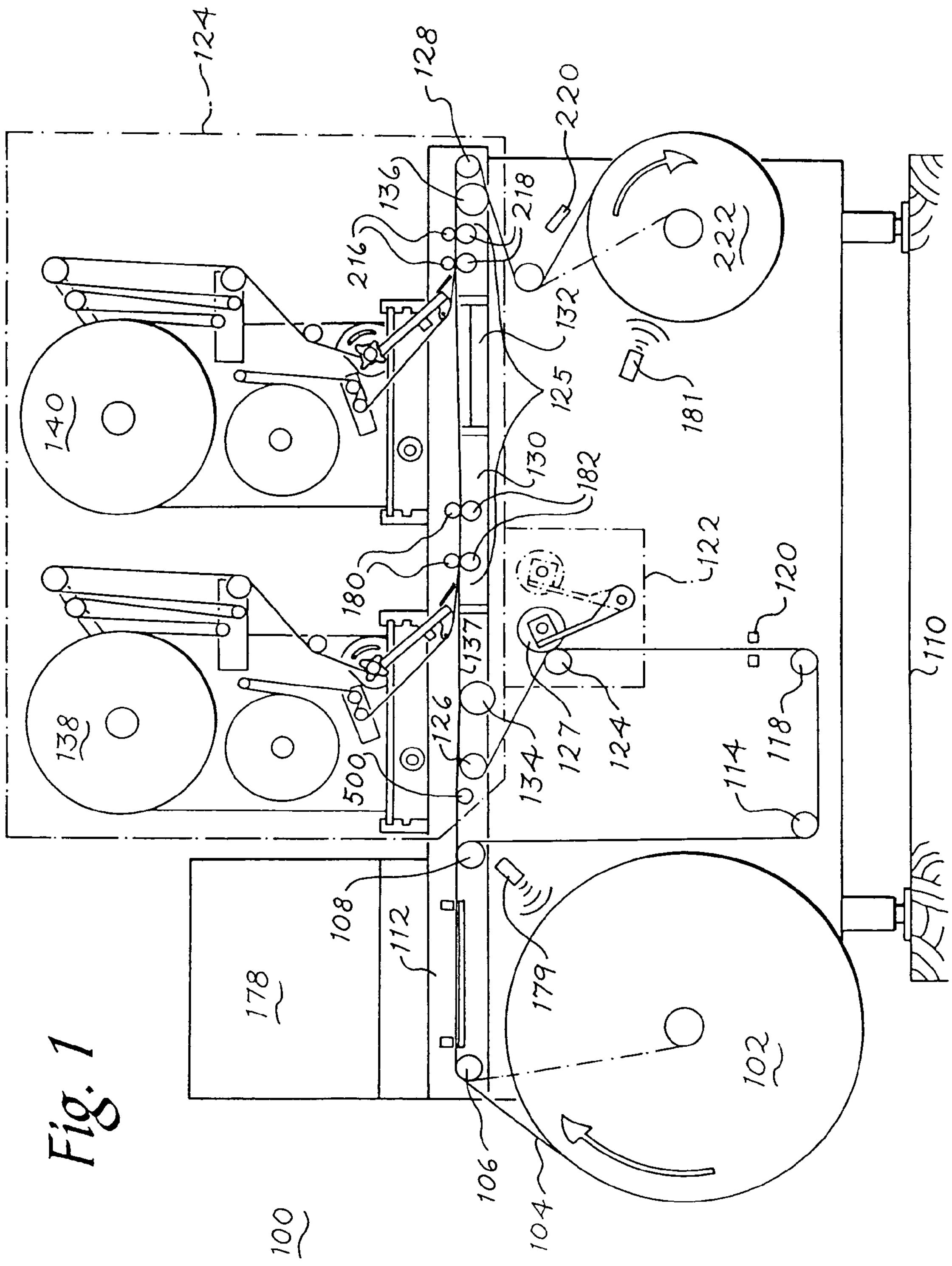
FIG. 1 shows a side view of an embodiment of a label manufacturing system in accordance with the present invention.
Figure 2:
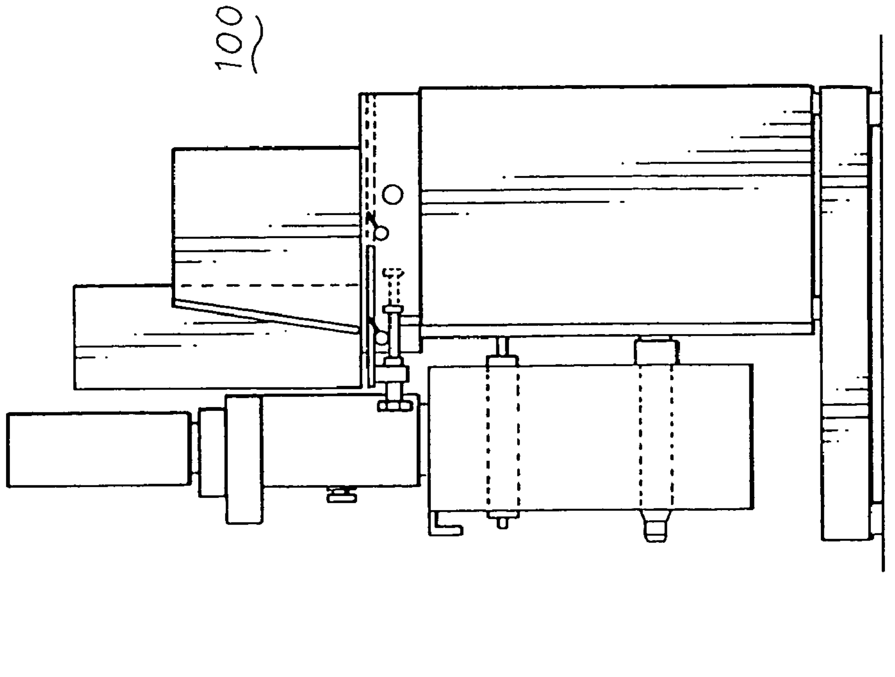
FIG. 2 shows a rear view of the label manufacturing system of FIG. 1.

FIGS. 1 and 2 show a label manufacturing system 100 that includes a dispensing reel 102 that contains a web or roll of a substrate 104. The dispensing reel 102 has a maximum diameter of approximately 30 inches. The substrate 104 preferably is made of an adhesive release material, such as a one-sided silicone coated release liner. An example of a suitable substrate 104 is the material sold under the trade name 42# Solventless Release Liner manufactured by Dunsirn Industries of Neenah, Wis.

As shown in FIG. 1, the substrate 104 is unwound from the dispensing reel 102 so as to contact a pair of metal rollers 106 and 108. The rollers 106 and 108 are positioned so that the substrate 104 moves parallel to the level ground 110 supporting the label manufacturing system 100. The rollers 106 and 108 are identical in shape having a diameter of approximately 2.362 inches and their axes of rotation are separated from one another by approximately 21.25 inches.

Positioned between the rollers 106 and 108 is a splicing table 112 that includes a pair of clamping arms 113 that span across the table and the substrate 104. When it is desired to cut the substrate 104 to remove the reel 102, for example, the clamping arms 113 are lowered to engage the substrate 104 along two lines perpendicular to the length of the substrate 104. As the clamping arms 113 are lowered, the label manufacturing system 100 is automatically shut off resulting in substrate 104 stopping its motion. After the substrate 104 is clamped by the clamping arms 113, a center cutting clamp (not shown) is pivoted downward between the two clamping arms 113. Once placed on the substrate 104, the center cutting clamp provides a straight edge perpendicular to the length of the substrate 104 along which the substrate is cut. After cutting, the reel 102 is removed, a new reel of substrate is inserted and the free end of the substrate of the new reel is taped to the free end of the substrate that was previously cut. An example of a splicing table 112 with clamping arms 113 and cutting clamp is the splicing table sold under the trade name of Self Healing Cutting Mat sold by Office Supply.

After moving past roller 108, the substrate 104 moves vertically downward to a pair of metal rollers 114 and 118 that are identical in shape having a diameter of approximately 2.5 inches and their axes of rotation are separated from one another by approximately 12 inches. The rollers 114 and 118 are positioned so that the substrate 104 moves parallel to the ground 110 between the rollers 114 and 118. After moving past the roller 118, the substrate 104 moves vertically upward through a web guide 120 that ensures that the web of the substrate 104 is properly aligned shortly after it passes through the encoder assembly 122 denoted by dashed lines.

As shown in FIG. 1, the encoder assembly 122 includes a metal roller 124 and a pivoting encoder 127. The metal roller 124 has a diameter of approximately 2.362 inches. The encoder 127 includes a rotating wheel that contacts the substrate 104 and measures the speed of the substrate 104. The encoder 127 generates a signal representative of the speed of the substrate 104 that is sent to applicator 140. A typical maximum speed for the substrate is approximately 300 feet per minute. As shown in phantom in FIG. 1, the encoder 127 can be pivoted out of contact with the substrate 104 when it is so desired.

Upon departing from the encoder assembly 122, the web of the substrate 104 is fed to a dispensing system 124 denoted by dashed lines. The dispensing system 124 provides a planar area 125 upon which security elements and preprinted labels are applied to the substrate 104. In particular, the dispensing system 124 includes an entry roller 126 and an exit roller 128 that define a path for the substrate 104 to follow that is parallel to the ground 110. The entry roller 126 and exit roller 128 are made of metal and are identical to one another having a diameter of 2.362 inches. The axes of rotation of the entry roller 126 and the exit roller 128 are separated from one another by approximately 42.125 inches.

Interposed between the entry roller 126 and the exit roller 128 is a conveyor system 130 that includes a conveyor belt 132 and a pair of wheels 134 and 136, wherein one or both of the wheels is motor driven. The conveyor belt 132 is made of a non-conductive material such as the material known as HABAIT FA35E. As shown in FIG. 1, the conveyor belt 132 has a top portion 137 upon which a portion of the substrate 104 lies. The wheels 134 and 136 are driven by the motor(s) (not shown) so that the linear speed of the conveyor belt 132 matches the linear speed of the substrate 104 that lies above the top portion 134. The matching of the linear speeds aids in diminishing the risk that the web of the substrate 104 will become skewed during the application of either the preprinted label or the security element as will be described below.

Figure 3:
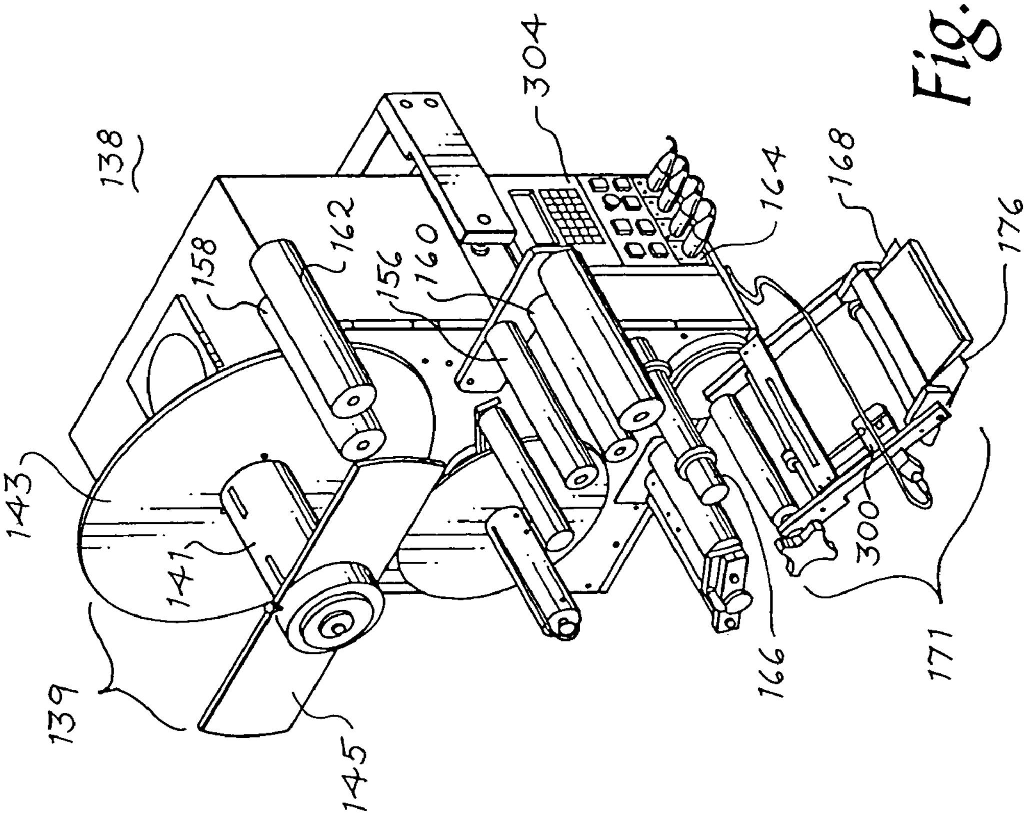
FIG. 3 shows a top perspective view of an embodiment of an applicator to be used with the label manufacturing system of FIG. 1.
Figure 4:
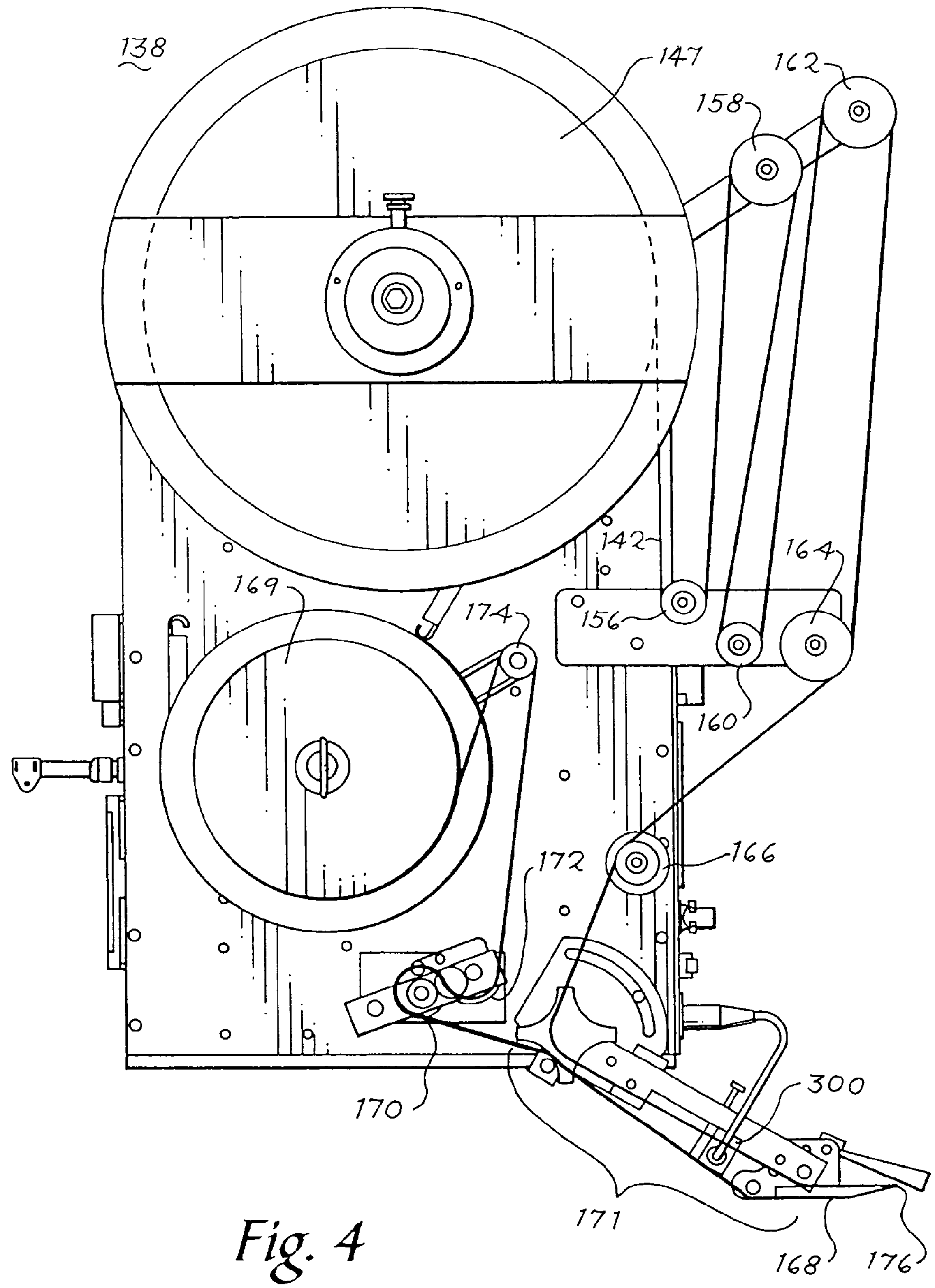
FIG. 4 shows a side view of the applicator of FIG. 3 that is processing a web with security element labels.

As shown in FIG. 1, the dispensing system 124 includes a pair of applicators 138 and 140 positioned above the substrate 104. Each applicator 138 and 140 is supported on an x-y table 400 that allows the applicators to move in the x and y directions in a plane parallel to the ground 110. The x-y tables 400 allow for registration of the label materials. As shown in FIGS. 3 and 4, the applicator 138 preferably is embodied as the SL-2000-III applicator manufactured and sold by Universal Labeling Systems Inc. of St. Petersburg, Fla. The applicator 138 has an unwind spool 139 that includes a rotatable cylinder 141, a circular base 143 and a removable clamping face 145. Once the clamping face 145 is removed, a 16 inch diameter reel 147, which has a web 142 of equally spaced rectangular security element labels 149, is placed on the cylinder 141 and clamped in place by clamping face 145. Each security element label 147 is separate from adjacent labels 149 so that a label 149 can be independently separated from the web 142. The web 142 preferably is made of a releasable liner material, such as silicone. Note that the security element labels 149 may have a variety of shapes and sizes depending on their intended use.

Figure 5:
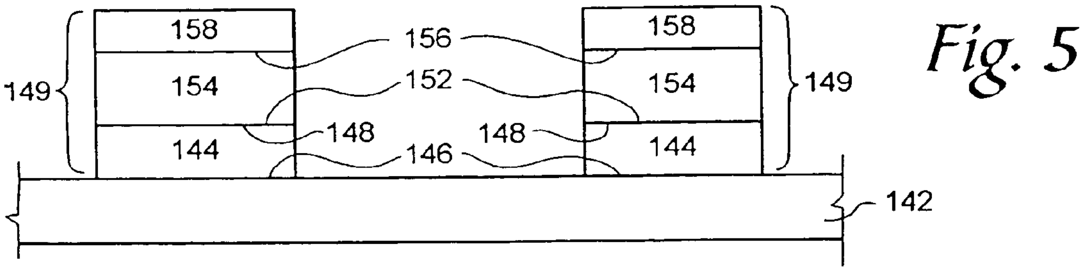
FIG. 5 shows a side cross-sectional view of an embodiment of the web with security element labels that is used with the applicator of FIG. 4.
Figure 6:
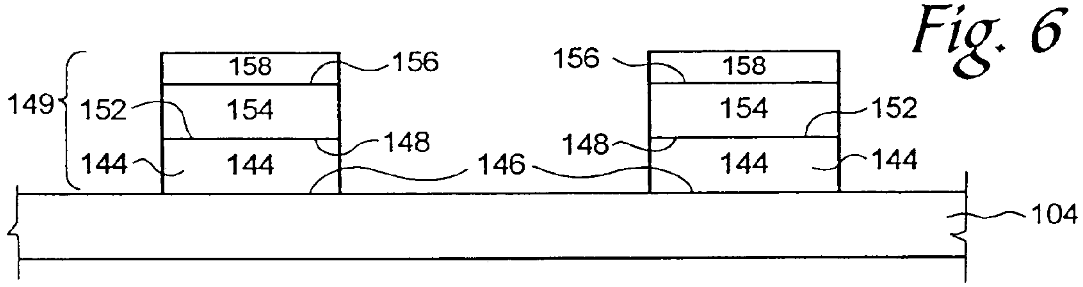
FIG. 6 shows a side cross-sectional view of the security element labels of FIG. 5 after being applied to a substrate of the label manufacturing system of FIG. 1.

As shown in FIGS. 5 and 6, each security element label 149 preferably includes a lower adhesive layer 144. The adhesive layer 144 has a lower surface 146 that releasably engages the web 142 and an upper surface 148 that adhesively engages a bottom surface 152 of a rectangular security element 154. The top surface 156 of the security element 154 adhesively engages a bottom surface of a substrate 158. An example of such a web 142 with security labels 149 attached thereto is the 410 Series sold by Checkpoint Meto of Sugar Hills, Ga. Of course, other types, sizes and/or shapes of the security elements 154 may be used depending on their intended use. For example, the security element 154 may include a magnetically soft metal strip, or a magnetically soft thin film coating or a magnetic material or an electromagnetically operating oscillating circuit having a capacitor and an inductor that emits electromagnetic waves when caused to resonate by an electromagnetic high-frequency field.

As shown in FIGS. 1 and 4, the web 142 with attached security labels 149 is unwound from the reel 147 and follows a meandering path defined by metal rollers 156, 158, 160, 162, 164 and 166. The web 142 and security labels 143 then arrive at a peeler plate 168 where the web 142 is separated from the upper surface 146 of the adhesive layer 144 of each security label 149 and rewound on a maximum 16 inch rewind reel 169 after traveling past metal rollers 170, 172 and 174. The peeler plate 168 is attached to a peeler plate support assembly 171 that is able to adjust the position of the peeler 168. It should be noted that metal roller 172 is attached to a motor so that rotation of the roller 172 causes the web 142 to be unwound from reel 147 and wound on reel 169.

The net effect of the applicator 138 is that individual security element labels 149 are separated from the web 142 and are dispensed at the end 176 of the peeler plate 168 so that the exposed lower surface 146 of the adhesive layer 144 adhesively engages the substrate 104 moving below the end 176. Thus, the security element labels 149 are attached to the substrate 104.

After the individual security element labels 149 are placed on the substrate 104, they are pressed onto the substrate 104 by a pressing mechanism. An example of a pressing apparatus is shown in FIG. 1 where two pairs of opposing metal upper rollers 180 and lower rollers 182 are shown. As shown in FIG. 1, the lower rollers 182 are positioned below the conveyor belt 132. Thus, the conveyor belt 132 is a support surface that allows pressing of the security element labels 149 by the rollers 180 and 182 so as to produce an adequate adhesion of the labels 149 to the substrate 104.

Another possible arrangement for the pressing apparatus is to replace the rollers 180 and 182 with a single iron roller, with or without a rubber surface, placed on top and across the substrate 104. The iron roller presses the security element labels 149 so as to produce an adequate adhesion of the labels 149 to the substrate 104.

Figure 7:
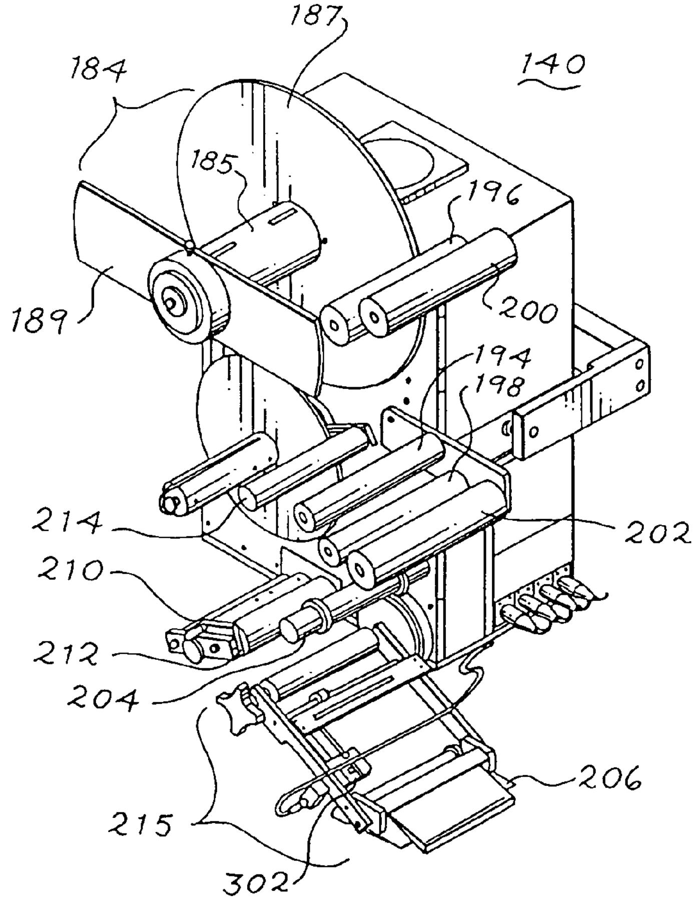
FIG. 7 shows a top perspective view of an embodiment of a second applicator to be used with the label manufacturing system of FIG. 1.
Figure 8:
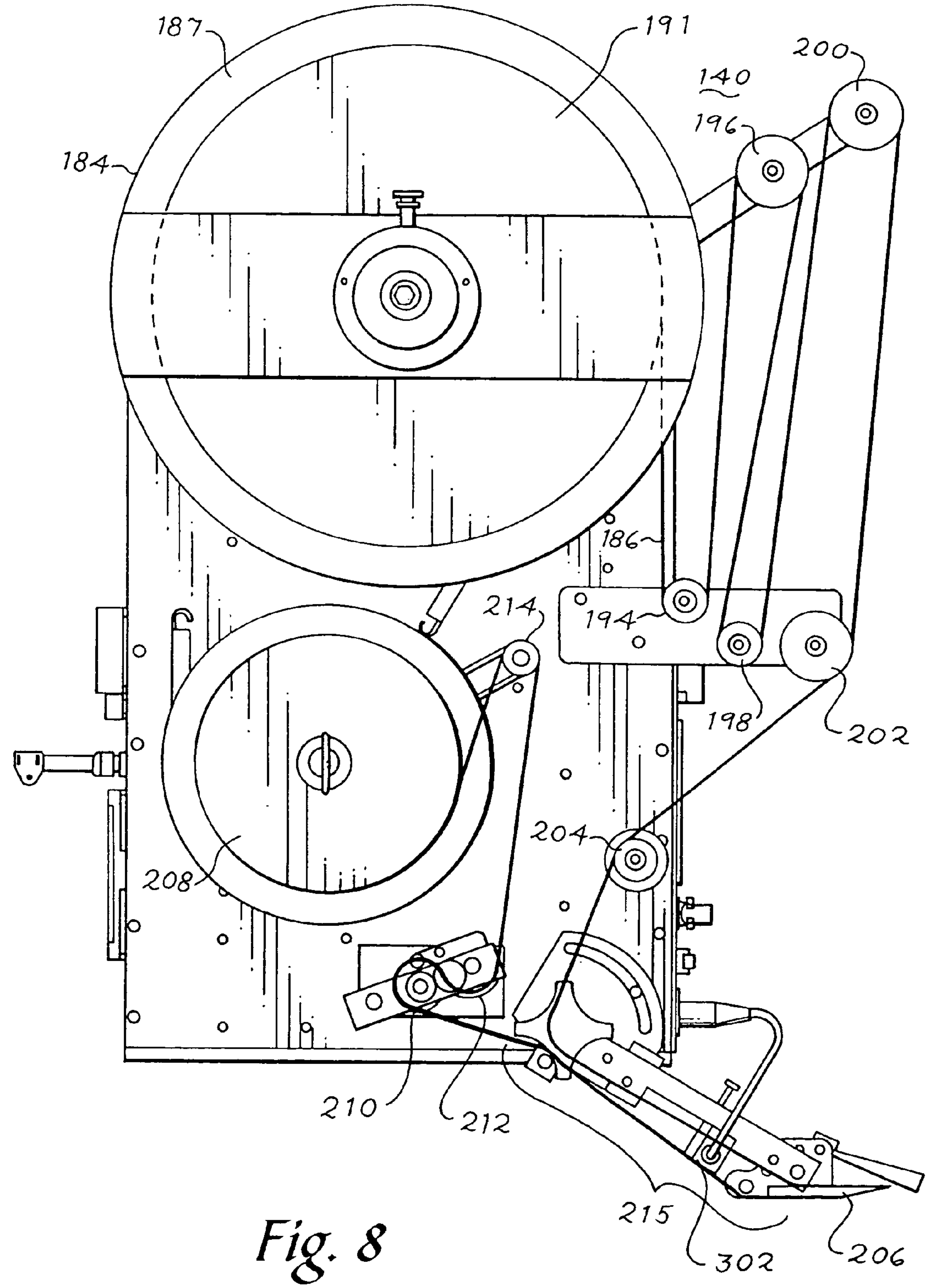
FIG. 8 shows a side view of the applicator of FIG. 7 that is processing a web with preprinted labels.

After passing the rollers 180 and 182, the substrate 104 and its attached security element labels 143 encounter a second applicator 140. As shown in FIGS. 7 and 8, the second applicator 140 has the same structure as the applicator 138 of FIGS. 3 and 4 and preferably is embodied as the SL-2000-III applicator manufactured and sold by Universal Labeling Systems Inc. of St. Petersburg, Fla. The applicator 140 has an unwind spool 184 that includes a rotatable cylinder 185, a circular base 187 and a removable clamping face 189. Once the clamping face 189 is removed, a 16 inch diameter reel 191, which has a web 186 of equally spaced preprinted rectangular labels 188, is placed on the cylinder 185 and clamped in place by clamping face 189. Each preprinted label 188 is separate from adjacent labels 188 so as to be independently separated from the web 186. Note that the preprinted labels 188 may have a variety of shapes and sizes depending on their intended use.

Figure 9:
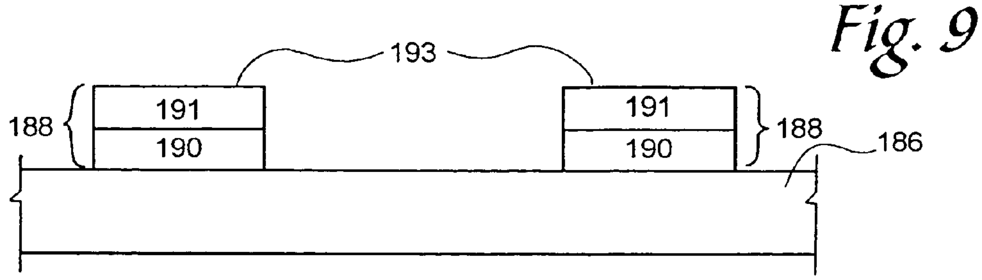
FIG. 9 shows a side cross-sectional view of an embodiment of the web with preprinted labels that is used with the applicator of FIG. 7.
Figure 10:
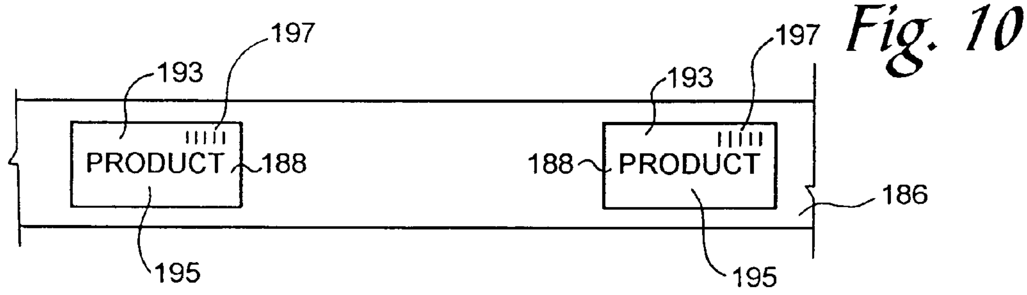
FIG. 10 shows a top view of the web with preprinted labels of FIG. 9.

As shown in FIG. 9, the preprinted label 188 includes an upper layer 191 made of such well known materials as paper, polyester or films with an adhesive layer 190 attached to its underside. As shown in FIG. 10, the exterior surface 193 of the upper layer 188 includes indicia, such as words 195 and/or a bar code 197 identifying the product to which the label is to be attached. As shown in FIG. 9, the adhesive layer 190 of the label 188 adhesively engages the web 186.

As shown in FIG. 8, the web 186 is unwound from the unwound reel 184 via metal rollers 194, 196, 198, 200, 202 and 204 to a peeler plate 206. The web 186 is separated from the adhesive layer 190 and rewound on a rewind reel 208 after traveling past metal rollers 210, 212 and 214. The peeler plate 206 is attached to a peeler plate support assembly 215 that is able to adjust the position of the peeler plate 206. It should be noted that metal roller 212 is attached to a motor so that rotation of the roller 212 causes the web 186 to be unwound from reel 184 and wound on reel 208.

Figure 11:
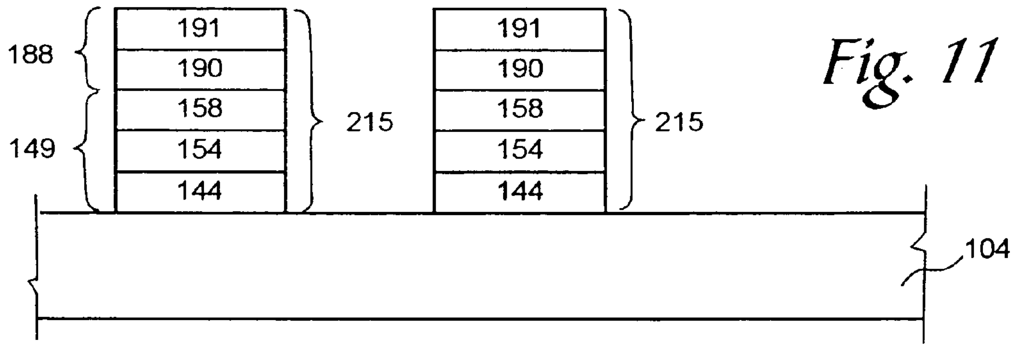
FIG. 11 shows a side cross-sectional view of the preprinted labels of FIGS. 9 and 10 after being applied to the security element labels and substrate of FIG. 6.
Figure 12:
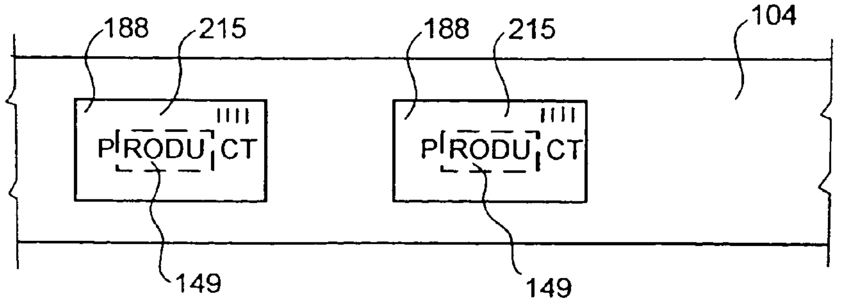
FIG. 12 shows a top view of the preprinted labels, security element labels and substrate of FIG. 11.

The applicator 140 differs from applicator 138 in that the speed of the reels 191 and 208 is maintained constant and is not varied in the manner that the reels of the applicator 138 are. The desired result is that each separated preprinted label is placed on top of each of the security elements attached to the web of the substrate 104 so as to form a security label. Since the preprinted labels 188 are typically larger in surface area than the security element labels 149 (see dashed lines of FIG. 12), the adhesive layer 190 will engages both the top surface 156 of the security element label and the substrate 104 as shown in FIGS. 11 and 12. The combination of the labels 188 and 149 will be referred to hereafter as a preprinted security label 215. After the individual preprinted labels 188 are placed on the security element labels 149 and the substrate 104, they are pressed by a pressing mechanism. An example of a pressing apparatus is shown in FIG. 1 where two pairs of opposing metal upper rollers 216 and lower rollers 218 are shown. As shown in FIG. 1, the lower rollers 218 are positioned below the conveyor belt 132. Thus, the conveyor belt 132 is a support surface that allows pressing of the preprinted labels 188 by the rollers 216 and 218 so as to produce an adequate adhesion of the preprinted labels 188 to the substrate 104 and the security element labels 149.

Another possible arrangement for the pressing apparatus is to replace the rollers 216 and 218 with a single iron roller, with or without a rubber surface, placed on top and across the substrate 104. The iron roller presses the preprinted labels 188 so as to produce an adequate adhesion of the preprinted labels 188 to the substrate 104 and the security element labels 149.

As shown in FIG. 1, the substrate 104 and its attached labels 215 are fed past a counter 220 that counts the number of labels formed. The substrate 104 and attached labels 215 are then wound on a rewind reel 222.

It should be noted that it is well known that electrostatic charge can be built up on the substrate 104 and the labels placed thereon. The electrostatic charge can be significantly reduced by using a static bar 500 as shown in FIG. 1. Another possibility for removing electrostatic charge is to place wire brushes at the ends of the peeler plates 168 and 206 so that the brushes contact the substrate 104 and the labels placed thereon.

It should be noted that the speeds of substrate 104, conveyor belt 132 and the webs 142, 186 are controlled electronically. In the case of the substrate 104, its speed is entered manually via a control system 178. The control system 178 then sends signals to the motors that drive the reels 102 and 222 and the wheels 134, 136 so that the substrate 104 and conveyor belt 132 move at the selected speed. The speed of the substrate 104 is also controlled by a pair of ultrasonic sensors 179 and 181 that monitor the diameters of reels 102 and 222, respectively, as shown in FIG. 1. If sensor 179 detects a diameter that is at a predetermined minimum value, then a signal is sent to control system 178 which shuts off the one or more motors driving reels 102 and 222. If sensor 181 detects a diameter that is at a predetermined maximum value, then a signal is sent to control system 178 to shut down the one or more motors of the reels 102 and 222.

The speed of the web 186 of applicator 140 is electronically controlled by the signal generated by the encoder 127. The signal is sent to a motor that rotates the wheel 212 of the applicator 140 shown in FIG. 8 so that the web 186 has a speed that matches that of the substrate 104.

Electronic control of the speed of the web 142 is more complicated. Such control is accomplished by a pair of optical sensors 300 and 302 that are placed adjacent to the ends of the peeler plates 168 and 206, respectively, as shown in FIGS. 3, 4, 7 and 8. The sensor 302 senses the edges of the preprinted labels 188 present on web 186. When an edge is sensed, the sensor 302 sends a signal to the controller 304 of applicator 138. Note that applicator 138 needs a start and stop signal to tell the applicator 138 to dispense a security element label 149 and to stop. This start and stop signal is supplied by sensor 300 that senses the edges of the security element labels 149. Note that when the applicator 138 does move the web 142 with security element labels 149, the web and labels move at the same speed as the substrate 104. This is so because the encoder 127 sends a signal representative of the speed of the substrate 104 to a motor that rotates the wheel 172 of the applicator 138 shown in FIG. 4 so that during dispensing of the security element labels the web 142 has a speed that matches that of the substrate 104.

The controller 304 allows the user to enter, via a keypad, variable information for the labels to be dispensed by the applicators 138 and 140. Based on the variable information and the signals received from sensors 300 and 302, the controller 304 calculates when a security element label 149 is to be placed on the substrate 104. Based on its calculation, the controller 304 sends a signal to the motor that rotates wheel 172 of applicator 138 so that a security element label 149 is placed on the substrate 104 so that a preprinted label 188 will later on be correctly placed on top of the security element label 149 by applicator 140.

Once a desired count of labels or a desired diameter of the reel 222 has been achieved, the substrate and its attached labels are cut at the reel 222 and the reel 222 is removed and packaged for later sale to a customer. A new reel 222 is inserted and the substrate 104 remaining is taped to the new reel 222 so that the process can be repeated.

The customer, to whom the reel 222 is sold, then applies the labels 215 to an article, by peeling the labels 215 off of the substrate 104 and applying the exposed adhesive layer 144 to the article.

Figure 13:
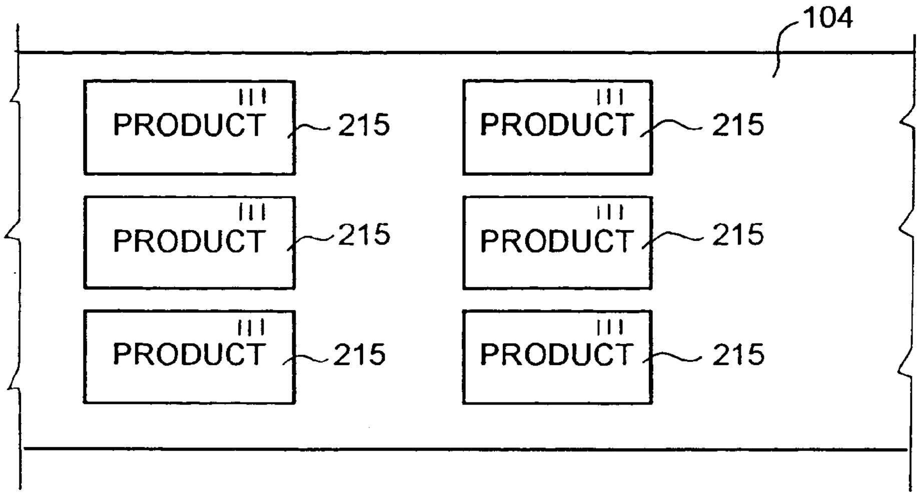
FIG. 13 shows a top view of the preprinted security element labels and substrate generated by a modified label generating system in accordance with the present invention.

Note that other embodiments of the label manufacturing system 100 are possible. For example, the label manufacturing system 100 can be modified to generate multiple rows of preprinted security element labels. In the example shown in FIG. 13, three rows of preprinted security element labels 215 can be generated on a single substrate 104 by the modified manufacturing system. In order to generate the preprinted security element labels of FIG. 13, the label manufacturing system 100 is modified so that its various wheels and reels can accommodate wider webs of substrate, security element labels and preprinted labels. In the case of generating three rows, the widths of the webs and the lengths of the wheels will need to be enlarged by a factor of three when compared with the embodiment of FIG. 1. The width of the conveyor belt will also need to be increased by a factor of three.

Figure 14:
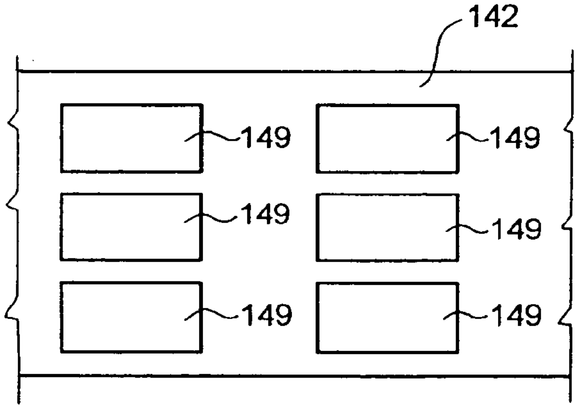
FIG. 14 shows a top view of the security element labels used to form the preprinted security element labels of FIG. 13.
Figure 15:
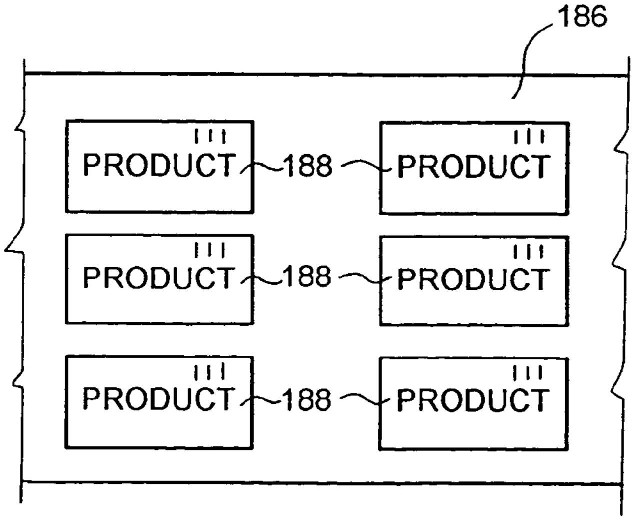
FIG. 15 shows a top view of the preprinted labels used to form the preprinted security element labels of FIG. 13.

Regarding the applicators 138 and 140, the peeler plates will be enlarged by a factor of three to accommodate the wider webs being dispensed. As shown in FIGS. 14 and 15, the webs 142, 186 of the applicators 138 and 140 will also have three rows of labels 149 and 188, respectively. Accordingly, peeler plate 168 will have three sensors 300 that will sense each row of the labels 149 and peeler plate 206 will have three sensors 302 that will sense each row of the labels 188. The signals from the sensors 300 and 302 are sent to the controller 304 and processed with the size information entered in controller 304 in the same manner as described previously with respect to the single row example of the system 100 of FIGS. 1–12.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A label manufacturing system comprising:

a web of a substrate that moves along a first direction; and a dispensing system comprising:

- a planar area that moves parallel to said first direction and below said web, wherein said web moves substantially independently of said planar area and said web lies upon said planar area;
- an applicator that places a label upon a portion of said web that lies above said planar area; and
- a second applicator that places a second label upon said label placed on said portion of said web that lies above said planar area.

2. The label manufacturing system of claim 1, wherein said dispensing system further comprises a pressing apparatus that presses said second label onto said label located on said portion of said web so as to attach said second label to said label.

3. The label manufacturing system of claim 2, wherein said web and said planar area move at substantially the same speed while said second label is being pressed by said pressing apparatus onto said label located on said portion of said web.

4. The label manufacturing system of claim 1, wherein said dispensing system comprises a moving conveyor belt that defines said planar area.

5. The label manufacturing system of claim 1, wherein said label comprises a security element.

6. The label manufacturing system of claim 5, wherein said security element comprises a magnetically soft material.

7. The label manufacturing system of claim 5, wherein said security element comprises a magnetic material.

8. The label manufacturing system of claim 5, wherein said security element comprises an electromagnetically operating oscillating circuit.

9. The label manufacturing system of claim 5, wherein said second label comprises indicia.

10. The label manufacturing system of claim 9, wherein said indicia comprises alphanumerics.

11. The label manufacturing system of claim 9, wherein said indicia comprises a bar code.

12. A label manufacturing system comprising:

a web of a substrate that moves along a first direction; and a dispensing system comprising:

a planar area that moves parallel to said first direction and below said web, wherein said web moves substantially independently of said planar area and said web lies upon said planar area; and an applicator that places a label upon a portion of said web that lies above said planar area, wherein said applicator places a second label upon a second portion of said web simultaneously with the placement of said label upon said portion of said web that lies above said planar area.

13. A process for manufacturing a label comprising:

moving a web of a substrate along a first direction;

moving a planar area parallel to said first direction and below said web, wherein said web lies upon said planar area and said moving of said web is performed substantially independently of said moving said planar area;

placing a label upon a portion of said web that lies above said planar area;

pressing said label onto said portion of said web so as to attach said label to said portion of said web; and controlling the linear speed of said web along said first direction relative to the linear speed of said planar portion parallel to said first direction so as to diminish the risk that said web becomes skewed during said pressing.

14. The process of claim 13, wherein said web and said planar area move at the substantially the same speed during said pressing.

15. A process for manufacturing a label comprising:

moving a web of a substrate along a first direction;

moving a planar area parallel to said first direction and below said web, wherein said web lies upon said planar area and said moving of said web is performed substantially independently of said moving said planar area;

placing a label upon a portion of said web that lies above said planar area; and attaching said label to a second web prior to said placing.

16. The process of claim 15, further comprising separating said second web from said label.

17. A process for manufacturing a label comprising:

moving a web of a substrate along a first direction;

moving a planar area parallel to said first direction and below said web, wherein said moving of said web is performed substantially independently of said moving said planar area;

placing a label comprising a label upon a portion of said web that lies above said planar area; and attaching said label to a second web prior to said placing.

18. The process of claim 17, further comprising separating said second web from said label.

19. A process for manufacturing a label comprising:

moving a web of a substrate along a first direction;

moving a planar area parallel to said first direction and below said web, wherein said web lies upon said planar area and said moving of said web is performed substantially independently of said moving said planar area;

placing a label upon a portion of said web that lies above said planar area; and placing a second label upon said label placed on said portion of said web that lies above said planar area.

20. The process of claim 19, further comprising pressing said second label onto said label located on said portion of said web so as to attach said second label to said label.

21. The process of claim 20, comprising controlling the linear speed of said web along said first direction relative to the linear speed of said planar portion parallel to said first direction so as to diminish the risk that said web becomes skewed during said pressing.

22. The process of claim 21, wherein said web and said planar area move at the substantially the same speed during said pressing.

23. The process of claim 20, wherein said web and said planar area move at the substantially the same speed during said pressing.

24. The process of claim 19, wherein said label comprises a security element.

25. The process of claim 24, wherein said second label comprises indicia.

26. A process for manufacturing a label comprising:

moving a web of a substrate along a first direction;

moving a planar area parallel to said first direction and below said web, wherein said moving of said web is performed substantially independently of said moving said planar area;

placing a label upon a portion of said web that lies above said planar area; and placing a second label upon a second portion of said web simultaneously with said placing of said label upon said portion of said web that lies above said planar area.

27. A process for manufacturing a label comprising:

moving a web of a substrate along a first direction;

placing a label upon a portion of said web;

pressing said label onto said portion of said web so as to attach said label to said portion of said web; and diminishing skewing of said portion of said web during said pressing, wherein said diminishing comprises:

controlling the linear speed of said web along said first direction; and moving a planar portion parallel to said first direction; and wherein said web moves substantially independently of said planar area during said diminishing skewing.

28. The process of claim 27, wherein said controlling of said linear speed of said web is relative to the linear speed of said planar portion parallel to said first direction.

29. The process of claim 28, wherein said web and said planar area move at the substantially the same speed during said pressing.

30. The process of claim 27, wherein said label comprises a security element.

31. The process of claim 27, wherein said label comprises indicia.

32. The process of claim 27, further comprising placing a second label upon said label.

33. The process of claim 32, further comprising pressing said second label onto said label located on said portion of said web so as to attach said second label to said label.

34. The process of claim 32, wherein said label comprises a security element.

35. The process of claim 34, wherein said second label comprises indicia.

36. The process of claim 27, further comprising placing a second label upon a second portion of said web simultaneously with said placing of said label upon said portion of said web.

* * * * *